United States Patent [19]

Nakamura et al.

[11] Patent Number: 5,199,679
[45] Date of Patent: Apr. 6, 1993

[54] HEIGHT ADJUSTING DEVICE FOR A SEAT

[75] Inventors: Yoshihiko Nakamura, Okazaki; Yukifumi Yamada, Toyota, both of Japan

[73] Assignee: Aisin Seiki Kabushiki Kaisha, Japan

[21] Appl. No.: 726,377

[22] Filed: Jul. 5, 1991

[30] Foreign Application Priority Data

Jul. 26, 1990 [JP] Japan .................. 2-198281

[51] Int. Cl.⁵ .............................. A45D 19/04
[52] U.S. Cl. .................... 248/394; 248/421; 297/313; 297/338
[58] Field of Search ............... 248/371, 394, 395, 396, 248/397, 398, 421; 297/313, 325, 330, 338

[56] References Cited

U.S. PATENT DOCUMENTS

| | | | |
|---|---|---|---|
| 4,325,527 | 4/1982 | Berneking | 248/394 |
| 4,643,383 | 2/1987 | Fukuta | 248/396 |
| 4,767,156 | 8/1988 | Yamada | 297/313 |
| 4,787,594 | 11/1988 | Ikegaya | 248/396 X |
| 4,828,213 | 5/1989 | Saito | 297/338 X |
| 4,871,137 | 10/1989 | Ikegaya | 248/394 X |
| 4,986,509 | 1/1991 | Suzuki | 248/421 X |
| 5,088,841 | 2/1992 | Ikegaya | 297/344 |

FOREIGN PATENT DOCUMENTS 60-16622 2/1985 Japan.

Primary Examiner—J. Franklin Foss
Attorney, Agent, or Firm—Finnegan, Henderson, Farabow, Garrett & Dunner

[57] ABSTRACT

A height adjusting device for a seat comprises a seat-cushion, an operating mechanism for moving simultaneously a frontward portion and a rearward portion of a seat-cushion in the vertical direction, and a reclining mechanism for adjusting of the reclining angle of the seat-cushion by moving the frontward portion thereof in the vertical direction wherein the operating mechanism is operated without affecting the adjusted reclining angle of the seat-cushion established by the reclining mechanism.

6 Claims, 4 Drawing Sheets

HEIGHT ADJUSTING DEVICE FOR A SEAT

BACKGROUND OF THE INVENTION

The present invention relates to a height adjusting device for a seat, especially one which is installed in a motor vehicle.

A conventional device of the kind is disclosed in, for example, Japanese Utility Model Registration Laid-open Print No. 60(1985)-16622 which was published in 1985 without examination. The conventional device includes a seat-cushion, a first operating mechanism for moving a rearward portion of the seat-cushion in the vertical direction, and a second operating mechanism for moving a frontward portion of the seat-cushion in the vertical direction. The first and second operating mechanisms are set to be operated independent from each other.

When the eye level of a seat occupant is desired to be changed or adjusted, the first operating mechanism is adjusted. This adjustment inevitably causes a change in the reclining angle of the seat-cushion which has been previously set. This results in a further re-adjustment of the reclining angle of the seat-cushion.

As mentioned above, as a whole, the operation required for adjusting the height of the seat-cushion is less than desirable or inconvenient due to the fact that two steps are required.

SUMMARY OF THE INVENTION

It is, therefore, a primary object of the present invention to provide a height adjusting device for a seat without the foregoing drawback.

It is another object of the present invention to provide a height adjusting device for a seat in which adjusting the height of a seat-cushion can be done without affecting the reclining angle which has been previously set.

To achieve the objects and in accordance with the purposes of the present invention, a height adjusting device for a seat comprises a lower arm, a seat-cushion having a front end portion and a rear end portion, a first operating mechanism including a rear bell-crank pivotally-connected to the lower arm and having one end portion connected to the rear end portion of the seat-cushion, a first sector-gear pivotally connected to the lower arm and connected to the other end portion of the rear bell-crank, and a first handle for rotating the first sector-gear, and a second operating mechanism including a second sector-gear pivotally connected to the lower arm, a swing link pivoted at one end portion thereof to the second sector-gear, a front bell-crank having one end portion connected to the front end portion of the seat-cushion and the other end portion connected to the first sector gear, and a second handle for rotating the second sector gear.

BRIEF DESCRIPTION OF THE DRAWINGS

The above and other objects, features and advantages of the present invention will be become more apparent and more readily appreciated from the following detailed description of preferred examplary embodiments of the present invention, taken in connection with the accompanying drawings, in which.

DETAILED DESCRIPTION OF THE PREFERRED EMBODIMENT

Figure 1:
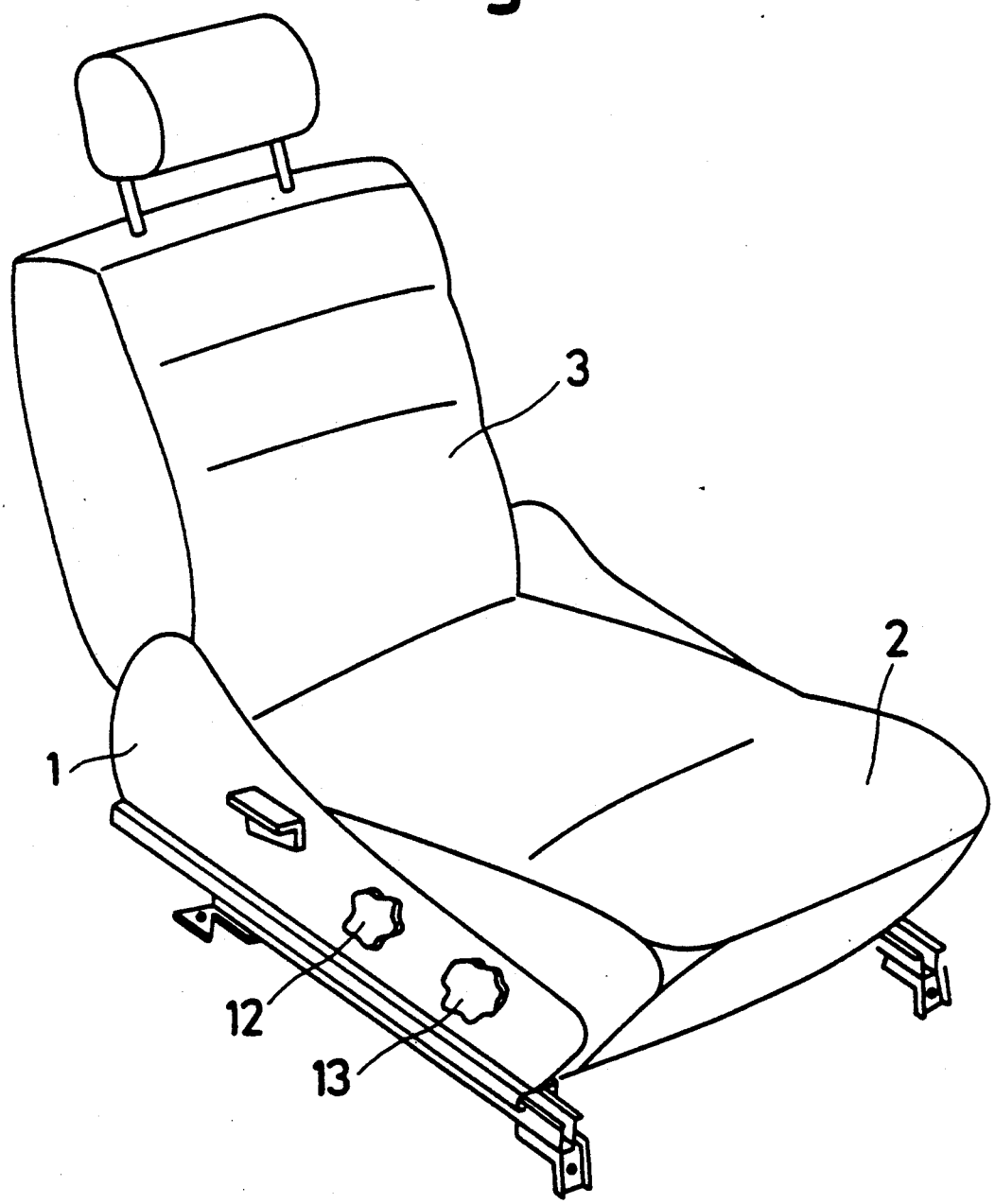
FIG. 1 is a perspective view of a seat to which an adjusting device according to the present invention is applied.

Referring first to FIG. 1, a seat-cushion 2 is supported by a pair of lower arms 1 (only one is indicated) so as to be adjustable in the vertical direction. At a rear end portion of the seat-cushion 2, there is pivoted a seat-back 3.

Figure 2:
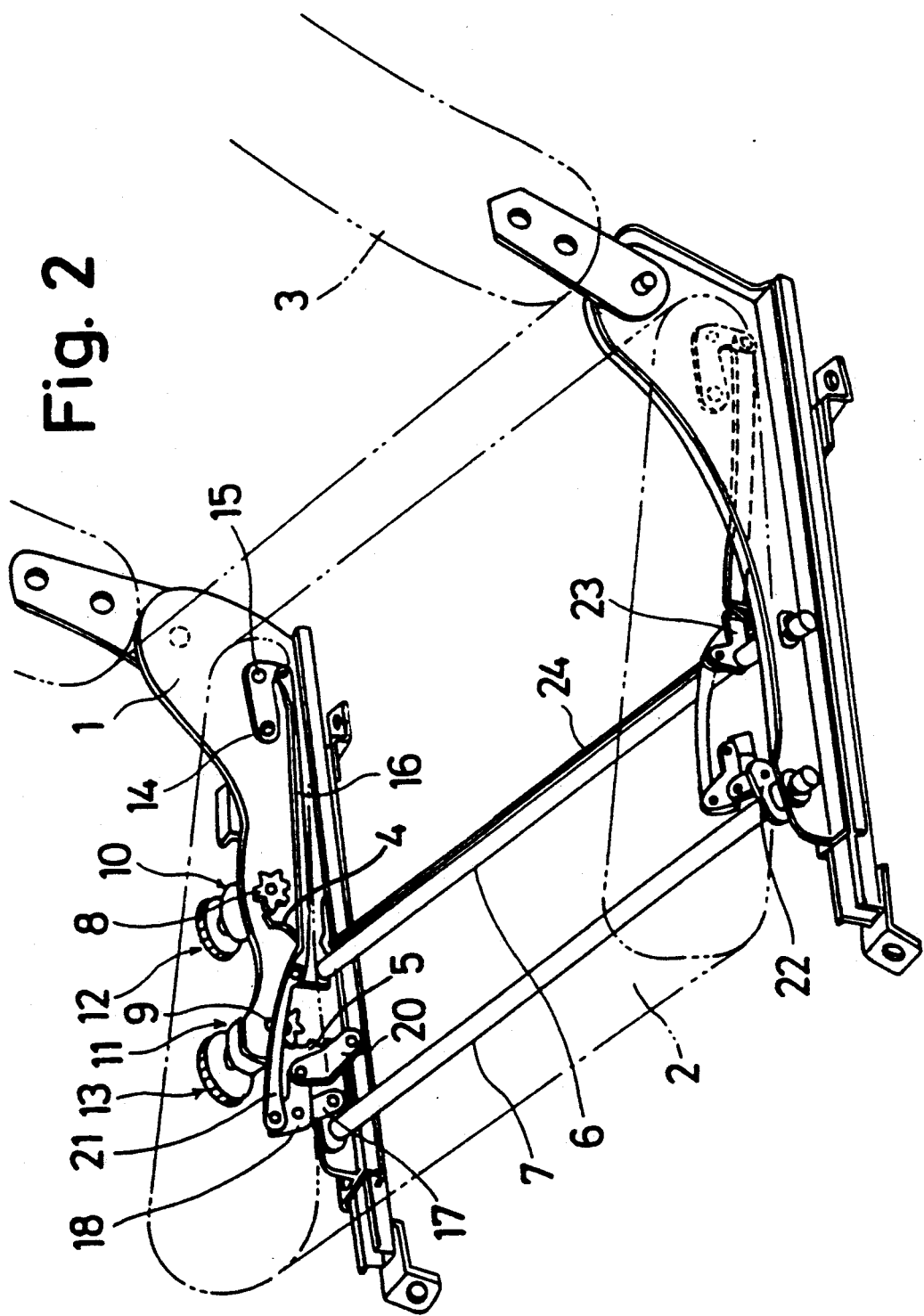
FIG. 2 is a perspective view of one embodiment of an adjusting device according to the present invention.
Figure 3:
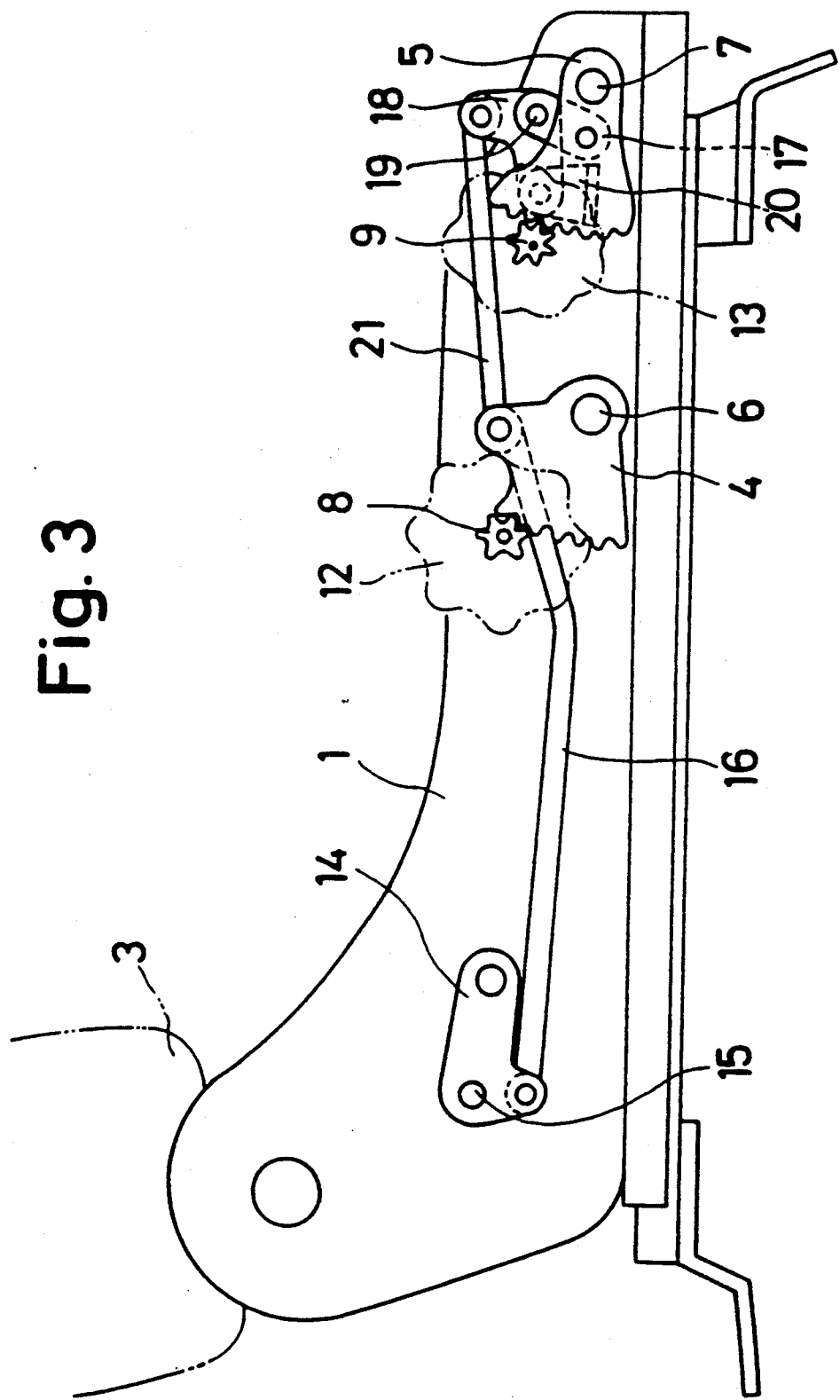
FIG. 3 is a plane view of an adjusting device shown in FIG. 2.

As shown in FIGS. 2 and 3, at a front end portion of the lower arm 1, there are rotatably provided a first sector gear 4 and a second sector gear 5 via a shaft 6 and a shaft 7, respectively. The first sector gear 4 (second sector gear 5) is connected with a first handle 12 (second handle 13) via a first pinion 8 (second pinion 9) and a first spring coupler 10 (a second spring coupler mechanism 11). Each spring coupler is of a well-known construction whose function is for preventing the reverse-rotation of the handle.

Figure 4:
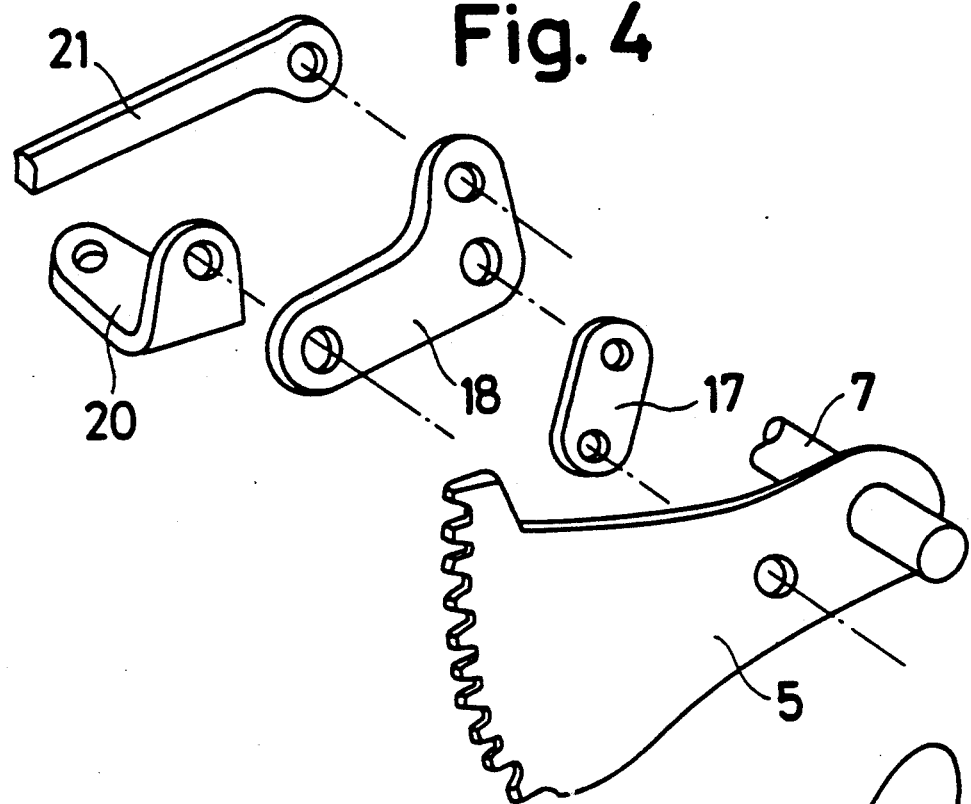
FIG. 4 is an exploded perspective view of a link mechanism.

At a lower end portion of the lower arm 1, there is rotatably mounted a bell-crank 14 via a pin 15 and one end of the bell-crank 14 is pivoted to the rear end portion of the seat-cushion. The other end of the bell-crank 14 is connected to the first sector-gear 4 via a link 16. Further, as shown in FIG. 4, the second sector-gear 5 is pivotally connected one end thereof to a swing link 17. At the other end of the second sector-gear 5, a bell-crank 18 is connected rotatably to link 17 via a pin 19. One end of the bell-crank 18 is pivotally connected to a bracket 20 which is secured to a front end of a lower portion of the seat-cushion 2. The other end of the bell-crank 18 is connected to the first sector-gear 4 via a link 21. The links 16 and 21 are pivotally connected to the first sector-gear 4 via a common pin.

At a side of another lower arm 1, a first driven link 22 and a second driven link 23 are provided which respectively correspond to the first-sector gear 4 and the second sector gear 5. The rotation of the first sector-gear 4 and the second sector-gear 5 are transmitted to the first driven link 23 and the second driven link 23 via a shaft 6 and a shaft 7 respectively. Along the shaft 6, there is arranged a leaf spring 24 whose opposite ends are secured to the first-sector gear 4 and the first driven link 22 in order to balance with a person or a passenger (not shown) who sits on the seat-cushion 2.

The operation of the foregoing structure will be described hereinafter. In FIGS. 2 and 3, when the first handle 12 is rotated in the counter-clockwise direction in FIG. 3, the resulting rotation is transmitted, via the spring coupler mechanism 10 and the pinion 8, to the first sector gear 4, which is brought into rotation in the clockwise direction about the pin 6. Due to the resulting rotation of the first sector gear 4, the links 16 and 21 are moved in the rightward direction in FIG. 3, thereby rotating the bell-crank 14 in the counter-clockwise direction about the pin 15 and the bell-crank 18 in the clockwise direction about the pin 19 respectively. Thus, the frontward portion and the rearward portion of the seat-cushion 2 are moved upwardly from the real-lined position to the phantom-lined position as shown in FIG. 5.

Figure 5:
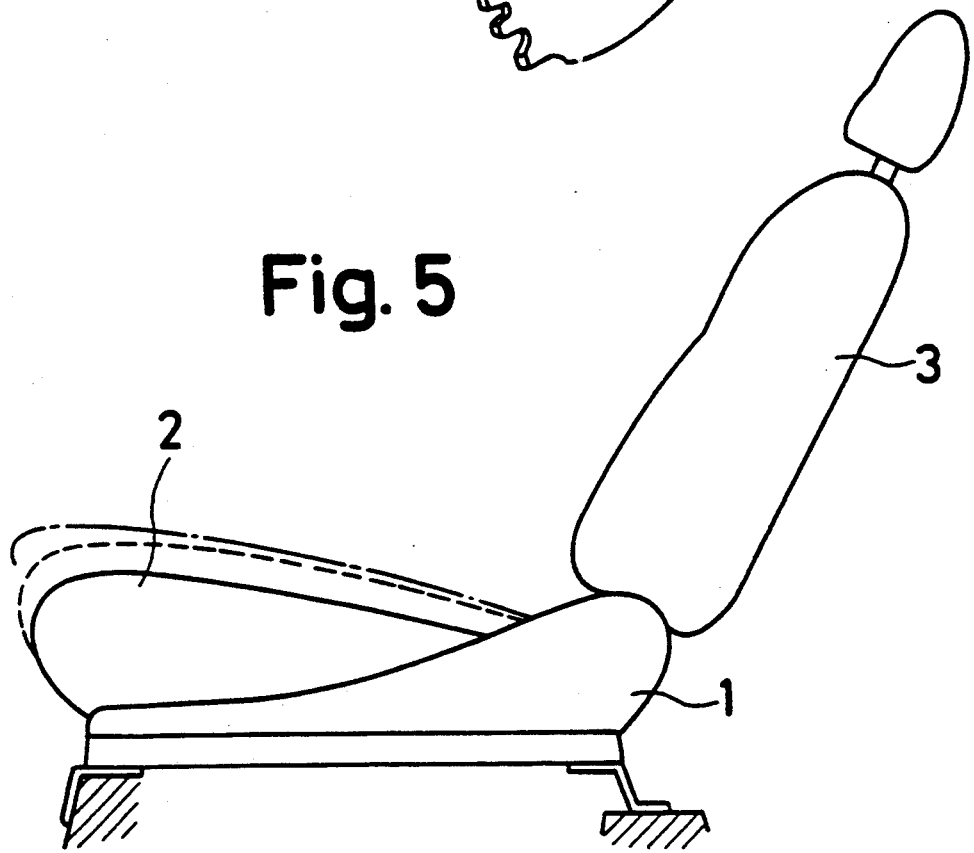
FIG. 5 is a view for illustrating the operation of one embodiment of an adjusting device according to the present invention.

On the other hand, when the first handle 12 is rotated in the clockwise direction in FIG. 3 which is contrary to the foregoing manner, the seat-cushion 2 is lowered from the phantom-lined position to the real-lined position in FIG. 5. In addition, when the second handle 13 is rotated in the counterclockwise direction in FIG. 3, the resulting rotation is transmitted, via the spring-coupler mechanism 11 and the pinion 9, to the second sector gear 5 resulting in the rotation thereof in the clockwise direction in FIG. 3. The resulting rotation of the second sector gear 5 causes the upward movement of the swing link 17 and bell-crank 18. Thus, the seat-cushion 2 is rotated in the clockwise direction in FIG. 5 about the portion at which the bell-crank 14 and the seat-cushion 1 are connected to each other, thereby moving the frontward portion of the seat-cushion 2 in the upward direction as indicated by the one-dotted chain line in FIG. 5. The relative movement of the seat-cushion in the radial direction due to the resulting rotation thereof is absorbed in the swing link 17. Contrary to this, when the second handle is rotated in the clockwise direction in FIG. 3, the frontward portion of the seat cushion 2 is lowered from one-dotted chain lined position to the real-lined position.

As mentioned above, in the foregoing structure, the first handle 12 is used for the vertical adjusting of both frontward and rearward portions of the seat-cushion 2 and the second handle 13 is used for the vertical adjustment of the frontward portion of the seat-cushion 2. This means that the first handle 12 enables the adjustment of the eye level of the seat occupant and the second handle 13 enables the adjustment of the reclining angle of the set-cushion 2.

In addition, upon the manipulation of the first handle 12, the frontward and rearward portions of the seat-cushion 2 are moved in the vertical direction simultaneously, thereby not affecting the set reclining angle of the seat-cushion 2.

Furthermore, the foregoing structure can be obtained only by adding the bell-crank 18 and the link 21 to the conventional structure.

Obviously, numerous modifications and variations of the present invention are possible in light of the above teachings. It is therefore to be understood that within the scope of the appended claims, the invention may be practiced otherwise than as specifically described herein.

What is claimed is:

1. A height adjusting device for a seat comprising:
a lower arm;
a seat-cushion having a front end portion and a rear end portion;
a first operating mechanism including a rear bell-crank pivotally-connected to the lower arm and having one end portion connected to the rear end portion of the seat-cushion, a first sector-gear pivotally-connected to the lower arm and connected to the other end portion of the rear bell-crank, and a first handle for rotating the first sector-gear a and
a second operating mechanism including a second sector-gear pivotally-connected to the lower arm, a swing link pivoted at one end portion thereof to the second sector-gear, a front bell-crank having one end portion connected to the front end portion of the seat-cushion and the other end portion connected to the first sector gear, and a second handle for rotating the second-sector gear.

2. A height adjusting device in accordance with claim 1 further comprising a first spring coupler disposed between the first sector-gear and the first handle, and a second spring coupler disposed between the second sector-gear and the second handle.

3. A height adjusting device in accordance with claim 1, wherein the first handle is provided with a first pinion which is in meshing engagement with the first sector-gear, and the second handle is provided with a second pinion which is in meshing engagement with the second sector-gear.

4. A height adjusting device in accordance with claim 3, wherein the first sector-gear and the second-sector gear are both connected to the lower arm so that their respective gears have the same rearward-facing orientation so as to be engaged with the first pinion and the second pinion, respectively.

5. A height adjusting device for a seat comprising:
a lower arm;
a seat-cushion having a front end portion and a rear end portion;
a first operating mechanism including a rear bell-crank pivotally-connected to the lower arm and having one end portion connected to the rear end portion of the seat-cushion, a first sector-gear pivotally-connected to the lower arm, a first link connecting the first sector-gear to the other end portion of the rear bell-crank, and a first handle for rotating the first sector-gear; and
a second operating mechanism including a second sector-gear pivotally-connected to the lower arm, a swing link pivotally-connected at one end portion thereof to the second sector-gear, a front bell-crank connected to the other end portion of the swing link and having one end portion connected to the front end portion of the seat-cushion, a second link connecting the first sector-gear to the other end portion of the front bell-crank, and a second handle for rotating the second sector gear.

6. A height adjusting device in accordance with claim 5 wherein said first link and said second link are connected together at said first sector-gear.

* * * * *